United States Patent [19]

Itoh

[11] Patent Number: 4,582,369

[45] Date of Patent: Apr. 15, 1986

[54] LINEAR MOTION BALL BEARING

[75] Inventor: Katsutoshi Itoh, Yamatotakada, Japan

[73] Assignee: Tsubakimoto Precision Products Co., Ltd., Japan

[21] Appl. No.: 617,994

[22] PCT Filed: Sep. 22, 1983

[86] PCT No.: PCT/JP83/00313

§ 371 Date: May 21, 1984

§ 102(e) Date: May 21, 1984

[87] PCT Pub. No.: WO84/01194

PCT Pub. Date: Mar. 29, 1984

[30] Foreign Application Priority Data

Sep. 24, 1982 [JP] Japan ................. 57-164974
Dec. 28, 1982 [JP] Japan ................. 57-227780
Dec. 28, 1982 [JP] Japan ............. 57-196148[U]
Dec. 28, 1982 [JP] Japan ............. 57-196159[U]

[51] Int. Cl.⁴ .................... F16C 29/06; F16C 33/66
[52] U.S. Cl. ............................ 308/6 C; 308/5 R
[58] Field of Search ............ 308/6 C, 5 R, 6 R, 3 A, 308/3 R

[56] References Cited

U.S. PATENT DOCUMENTS

| | | | |
|---|---|---|---|
| 4,273,389 | 6/1981 | Takai | 308/6 C |
| 4,339,157 | 7/1982 | Olschewski et al. | 308/6 C |
| 4,384,859 | 5/1983 | Teramachi | 308/6 C X |
| 4,428,627 | 1/1984 | Teramachi | 308/6 C |

FOREIGN PATENT DOCUMENTS

| | | | |
|---|---|---|---|
| 2129024 | 12/1971 | Fed. Rep. of Germany | 308/6 C |
| 10250 | 1/1977 | Japan . | |
| 136451 | 9/1979 | Japan . | |
| 37139 | 9/1981 | Japan . | |
| 38812 | 8/1982 | Japan . | |
| 928696 | 6/1963 | United Kingdom | 308/6 C |

Primary Examiner—Stuart S. Levy
Assistant Examiner—Thomas R. Hannon
Attorney, Agent, or Firm—Howson and Howson

[57] ABSTRACT

A linear motion ball bearing having pairs of axial bearing surfaces (4 and 4', 5 and 5') of a cross section of a radius of curvature which is slightly greater than the radius of the ball, formed in the opposed side surfaces of a bearing member (2) and a bearing rail (3), in which the distance ($L_2$) between the centers of curvature of the upper and the lower bearing surfaces formed in the bearing member (2) and the distance ($L_1$) between the centers of curvature of the upper and the lower bearing surfaces formed in the bearing rail (3) are different from each other.

5 Claims, 25 Drawing Figures

LINEAR MOTION BALL BEARING

FIELD OF THE INVENTION

The present invention relates to a ball bearing which is used for linear motions and to the ball retainer, the lubricating system and the sealing device of the same.

DESCRIPTION OF THE PRIOR ART

A ball bearing of this type, particularly, a ball bearing capable of bearing loads acting in four directions respectively, is disclosed in Japanese Patent Publication No. 38812/1982. However, such a ball bearing has a complicated construction and requires difficult machining.

A sealing device employed in such a ball bearing is disclosed in the said Japanese Patent Publication No. 38812/1982. In this sealing device, the side plate with a rubber sealing member for sealing in the axial direction and the bottom plate for sealing in the vertical direction are formed separately and are fixed by screws or the like individually, which requires an increased number of parts and is inferior in sealing effect.

An object of the present invention is to provide a linear motion ball bearing of a simple construction, requiring simple machining processes, capable of adjusting the preload optionally and provided with a new lubricating system and a new sealing device.

SUMMARY OF THE INVENTION

According to the present invention, there is provided a linear motion ball bearing having a pair of axial bearing surfaces each of a concave cross section having a radius of curvature slightly greater than the radius of the ball, formed in each of the respective opposed side surfaces of a bearing member and a rail base, wherein the distance between the centers of curvature of the pair of bearing surfaces formed in the bearing member and the distance between the centers of curvature of the pair of bearing surfaces of the rail base are different from each other and the upper and the lower bearing surfaces of the bearing member are formed at an interval slightly greater or less than the design value to apply a preload to the bearing.

Furthermore, the present invention provides a linear ball bearing having a pair of axial bearing surfaces each of a concave cross section having a radius of curvature slightly greater than the radius of the ball, formed in each of the respective opposed side surfaces of a bearing member and a rail base, wherein the balls are prevented from falling off from the bearing member by the cooperative functions of the bearing surfaces and a retainer interposed between the upper and the lower bearing surfaces of the bearing member, when the bearing member is separated from the rail base.

Thus the present invention provides a linear motion ball bearing of a comparatively simple construction, capable of bearing vertical and lateral forces and the moment of a force, of applying a preload easily, of preventing the balls from falling off when the bearing member is separated from the rail base, and of facilitating highly accurate grinding of the bearing surfaces owing to the disposition of the bearing surfaces in the respective side surfaces of the bearing member and the rail base.

A ball retainer according to the present invention has curved ball retaining surfaces extending symmetrically in cross section and projections formed at the opposite ends thereof so as to fit in the corresponding grooves formed in return caps, which facilitates and ensures positioning the ball retainer.

Furthermore, a ball return cap according to the present invention is provided with a through hole extending from the inner surface provided with ball return grooves toward the outer surface, a pair of grooves extending laterally in opposite directions from the outer end of the through hole and grooves extending from the inner end of the through hole into the ball return grooves.

Such a constitution of the ball return cap enables lubricating four bearing surfaces simultaneously through a single lubricating port and attains satisfactory lubrication. Furthermore, since both sides of the ball retainer cap are utilized effectively, the ball bearing can be designed in a compact construction.

Still further, a sealing device according to the present invention has a pair of side plates each provided with a sealing member for sealing in the axial direction and a pair of bottom plates each provided with a sealing member for sealing in the vertical direction are formed in an integral structure.

Such a constitution of the sealing device reduces the number of parts of the sealing device of a linear ball bearing and the integral structure of the side plates and the bottom plates provides excellent sealing effect.

BRIEF DESCRIPTION OF THE DRAWINGS

The accompanying drawings show embodiments of the present invention, in which.

BEST MODE FOR CARRYING OUT THE INVENTION

Figure 1:
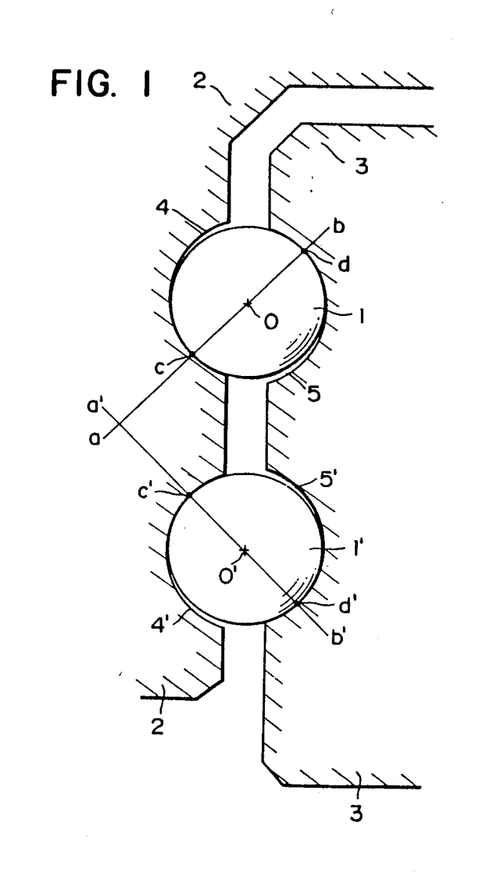
FIG. 1 is a partial cross-sectional view of a bearing member and the associated parts.
Figure 2:
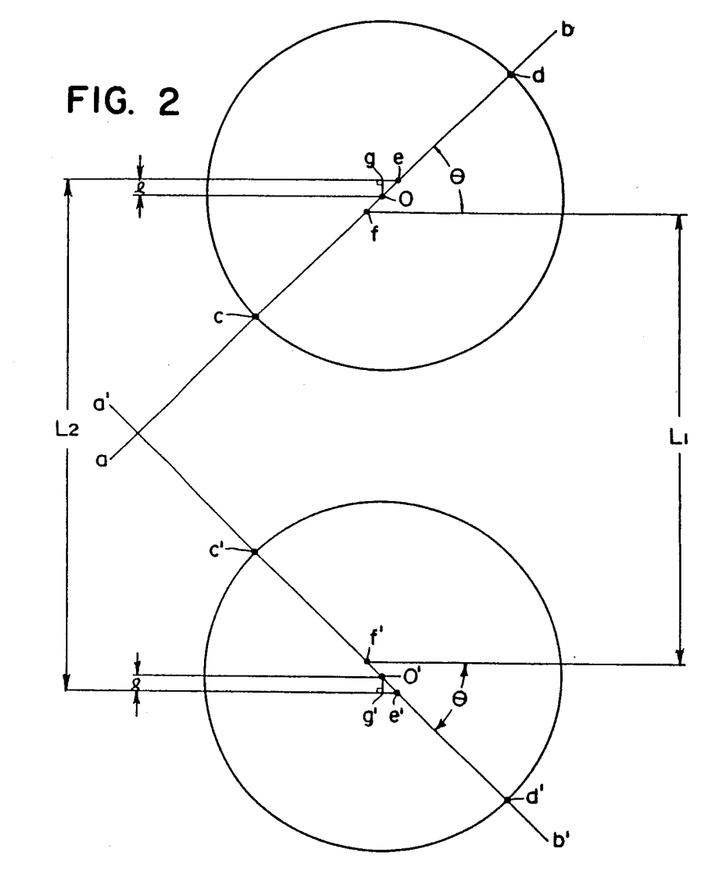
FIG. 2 is an enlarged view of the essential part of FIG. 1.

The present invention will be described hereinafter in connection with FIG. 1 showing a cross section of a bearing member taken along a plane perpendicular to the axial direction thereof, namely, the direction of movement thereof, (normally, the cross section is symmetrical with respect to the longitudinal center axis thereof, therefore only balls and bearing surfaces in the left side of the ball bearing are shown) and FIG. 2 showing the essential part of FIG. 1 in an enlarged view. Reference numerals 1 and 1' indicate balls of diameter D circulating through an upper race and a lower race respectively. The centers of the balls 1 and 1' are indicated by 0 and 0' respectively. The balls 1 and 1' are in contact with the bearing surfaces of a bearing member 2 and a rail base 3 at points c, d, c' and d' on oblique lines $\overline{ab}$ and $\overline{a'b'}$ intersecting horizontal lines at the centers 0 and 0' at an angle of $\theta$ respectively to enable the balls 1 and 1' to bear all of vertical and lateral loads and twisting forces. A pair of bearing surfaces 4 and 4' and a pair of bearing surfaces 5 and 5', each of a concave cross section, are formed axially in the opposed side surfaces of the bearing member 2 and the rail base 3 respectively. The radius of curvature R of the bearing surfaces 4, 4', 5 and 5' is slightly greater than the radius (D/2) of the ball and the centers of curvature thereof are located on the lines $\overline{ab}$ and $\overline{a'b'}$. Reference characters e and e', and f and f' indicate the centers of curvature of the bearing surfaces 4 and 4' of the bearing member 2 and the bearing surfaces 5 and 5' of the rail base 3. The distance $L_1$ between the points f and f' and the distance $L_2$ between the points e and e' are different from each other as shown in FIG. 2, which is a feature of the present invention.

In order to enable the ball bearing to bear all the loads of any direction, it is desirable that the angle $\theta$ is 45 degrees. With the angle $\theta$ being 45 degrees, suppose that the length of a segment $\overline{Og}$ (or $\overline{O'g'}$) of a perpendicular on a horizontal line passing the point e (or e') is l (g and g' are points of intersection of perpendiculars and horizontal lines passing the points 0 and 0' respectively) and $R = \alpha D$ ($\alpha$ is slightly greater than 0.5), then triangles $\Delta gOe$ and $\Delta g'O'e'$ are isosceles right triangles of 90° vertical angle and 45° base angles. Therefore, $$l = \frac{R - D/2}{\sqrt{2}} = \frac{2\alpha - 1}{2\sqrt{2}} D$$

Thus the relation between $L_1$ and $L_2$ is expressed by, $$L_2 = \frac{2\alpha - 1}{\sqrt{2}} D + L_1$$

Figure 3:
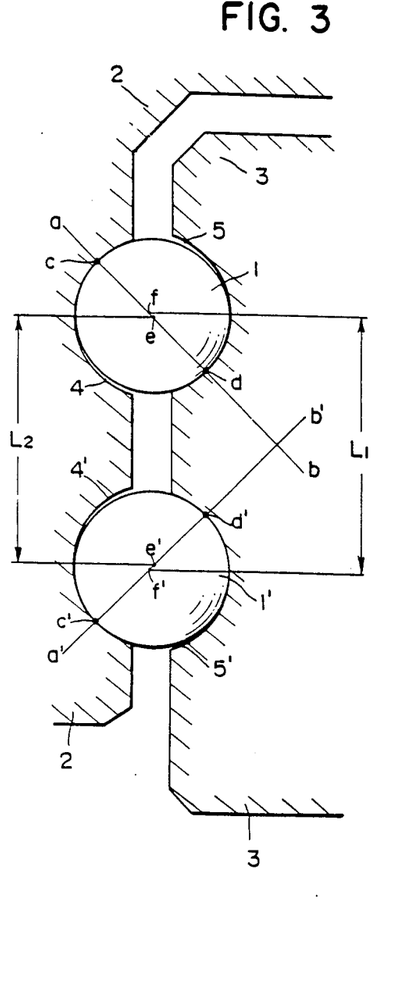
FIG. 3 is a partial cross-sectional view similar to FIG. 1, showing another embodiment of the present invention.

Although the invention has been described in terms of a constitution in which $L_2 > L_1$, it is also possible to form the bearing surfaces so that $L_2 < L_1$ as shown in FIG. 3. Accordingly, the ball bearing can be designed variously according to the load that works thereon.

Figure 4:
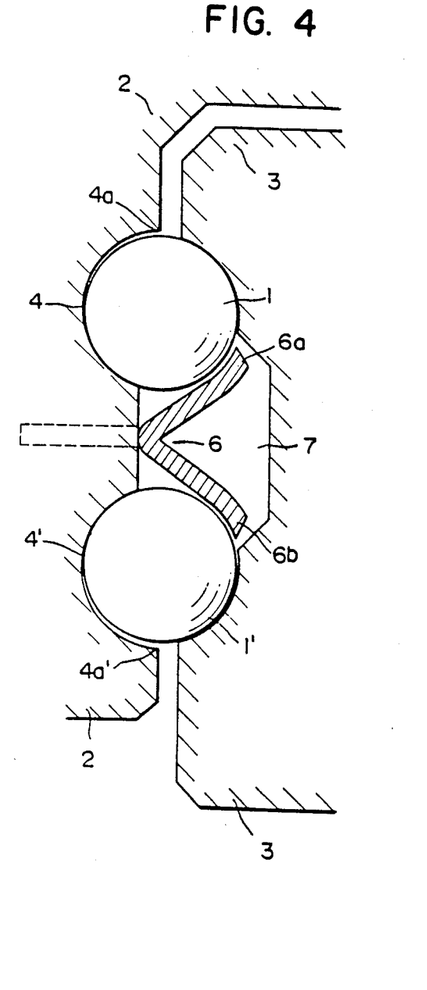
FIG. 4 is a view similar to FIG. 1, in which a retainer is provided.

FIG. 4 shows an embodiment of the present invention, in which a retainer (ball retainer) for preventing the balls from falling off when the bearing member 2 is separated from the rail base 3. A groove 7 is formed between the upper and the lower bearing surfaces of the rail base 3. A retainer 6 of a bifurcate cross section protruding toward the groove 7 is attached to the bearing member 2 between the upper and the lower bearing surfaces thereof. Accordingly, when the bearing member 2 is separated from the rail base 3, the balls 1 and 1' are retained in the bearing races by the cooperative function of the bifurcations 6a and 6b and the corners 4a and 4b of the opposite bearing surfaces 4 and 4' respectively. Conventional device of this type required a retainer of a complicated construction, whereas, according to the present invention, the balls can be retained surely by a retainer of a simple construction facilitating the manufacture thereof.

The ball bearing of the present invention can be preloaded by providing balls of a diameter slightly greater than the design diameter D in the bearing races or by forming the upper and the lower bearing surfaces of the bearing member so that the distance ($L_2$) between the centers of curvature of the upper and the lower bearing surfaces is slightly greater than the design values shown in FIG. 2 (slightly less than the design value, in the embodiment of FIG. 3). When the diameter of the ball is changed, the angle of contact of the ball remains unchanged, whereas when the distance between the centers of curvature of the upper and the lower bearing surfaces is changed, the angle of contact of the ball is changed slightly. However, practically, the amount of such a change is minute. The possibility of setting a preload optionally while restricting the change of the angle of contact of the ball to a minute degree is one of the features of the present invention.

Figure 5:
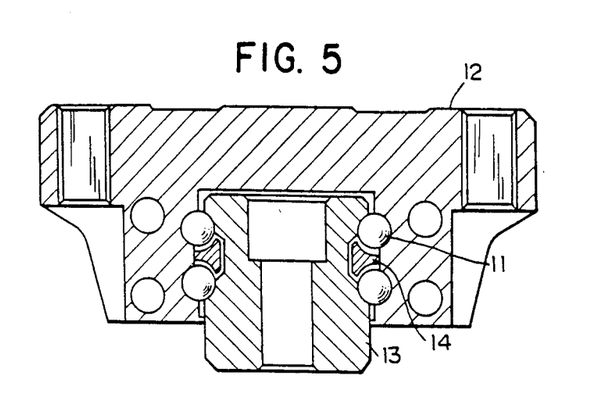
FIG. 5 is a general cross-sectional view of a linear ball bearing.
Figure 6:
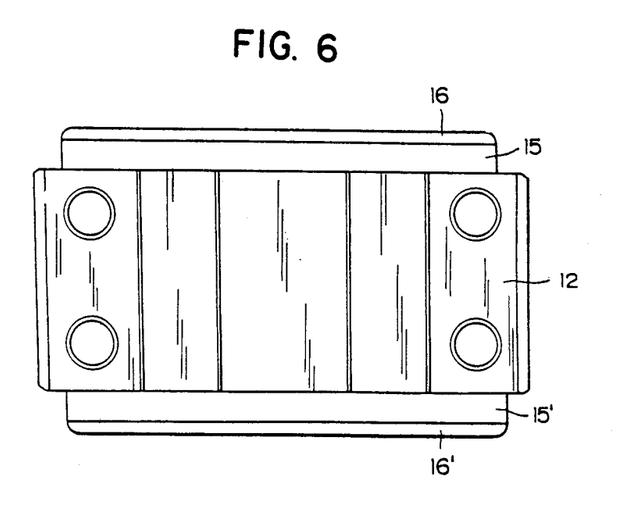
FIG. 6 is a plan view of FIG. 5.

Further description of ball retainers embodying the present invention will be given hereinafter. Referring to FIG. 5, there are shown balls 11, a bearing member 12 and a rail base 13. As illustrated in FIG. 6, a pair of ball return caps 15 and 15' are attached to the opposite ends of the bearing body 12. A pair of sealing plates 16 and 16' are attached to the exteriors of the ball return caps 15 and 15' respectively.

Figure 7:
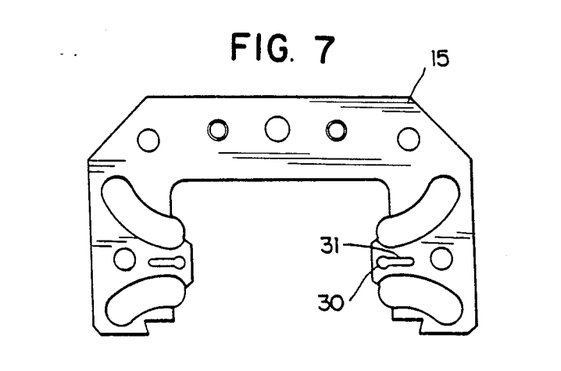
FIG. 7 is a front elevation of a ball return cap.
Figure 8:
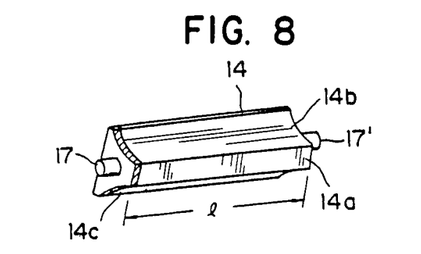
FIGS. 8 to 11 are perspective views showing various embodiments of the ball retainer.

A ball retainer 14 shown in FIG. 8 has has, as illustrated in FIG. 5 in a cross section, symmetrical curved ball retaining surfaces 14b and 14c, which cooperate with the corners of upper and lower bearing surfaces in retaining the balls 11 so that the balls will not fall off when the bearing member 12 is separated from the rail base 13. The length l of the body of the ball retainer is equal to the length of the bearing member 12. As illustrated in FIG. 8, cylindrical projections 17 and 17' are formed at the opposite ends, respectively, of the ball retainer 14. The ball retainer 14 is positioned simply by fitting the projections 17 and 17' in circular holes 30 formed in the pair of return caps 17 and 17' shown in FIG. 7. Disposing the ball retainer 14 with the bottom portion 14a thereof in contact with the inner surface of the bearing member 12 restrains the ball retainer 14 from turning on the projections 17. Forming recesses of a shape corresponding to the shape of the cross section of the ball retainer 14 in the side surfaces of the return caps 15 and 15' in addition to the circular holes 30 and fitting the shaded portion of the ball retainer 14 shown in FIG. 8 in the recesses respectively will ensure positioning the ball retainer further. Naturally, in this arrangement, the length l of the ball retainer is greater than that of the bearing member 12.

Figure 10:
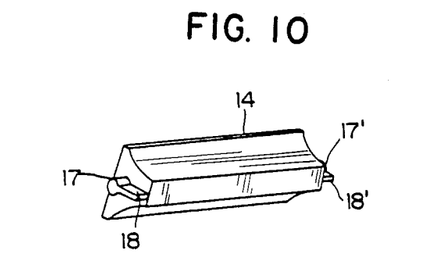

In assembling a linear ball bearing incorporating a ball retainer embodying the present invention, first one ball retainer cap 15 is screwed to the bearing member 12, then the projection 17 is fitted in the circular hole 30, and then balls are put in the bearing races. Therefore, the ball retainer is held only at one end thereof and has not yet been fixed securely when the balls are put in the bearing races. Accordingly, it is possible to fix the ball retainer more securely by forming flat projections 18 and 18' as shown in FIG. 10 in the ball retainer and rectangular holes 31 of a shape corresponding to the shape of the cross section of the flat projection in the ball returning caps in addition to the circular holes 30 and fitting the cylindrical and the flat projections into the circular and rectangular holes.

Figure 9:
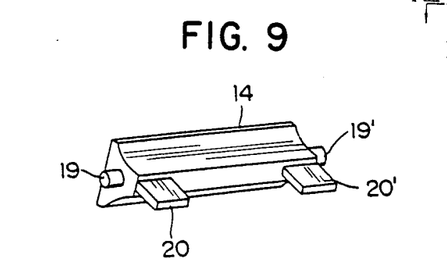

A ball retainer shown in FIG. 9 is provided with flat projections 20 and 20' at the opposite ends of the bottom portion 14a of the ball retainer 14, in addition to cylindrical projections 19 and 19'. The flat projections 19 and 19' are fitted in the corresponding recesses' not shown, formed in the bearing member 12. This constitution enables the ball retainer to be fixed securely at the opposite ends thereof to the bearing member 12 even when only one of the ball returning cap is attached to the bearing member 12, which facilitates assembling the linear ball bearing.

Figure 11:
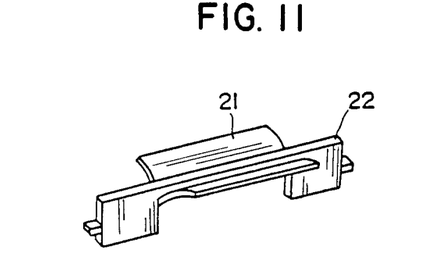

Essentially, the ball retainer needs only to be provided with curved ball retaining surfaces extending laterally in a cross section, it is possible to assemble a ball retainer by welding, caulking or soldering from pressed thin metal plates 21 and 22.

Figure 12:
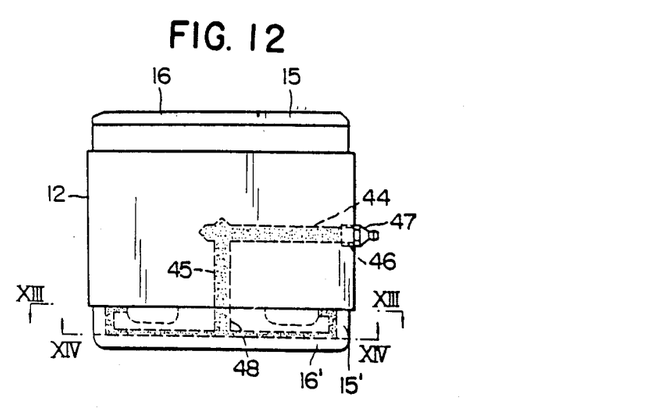
FIG. 12 is a top plan view showing a lubricating system.
Figure 13:
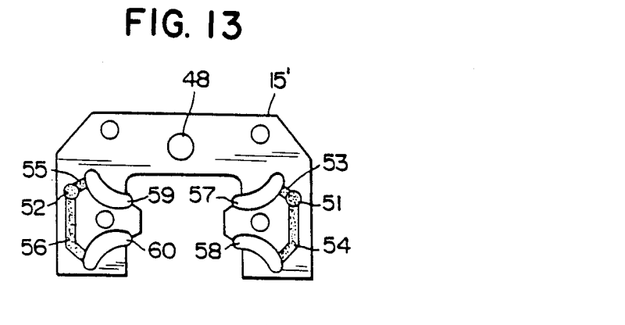
FIG. 13 is a sectional view taken along line XIII—XIII of FIG. 12.
Figure 14:
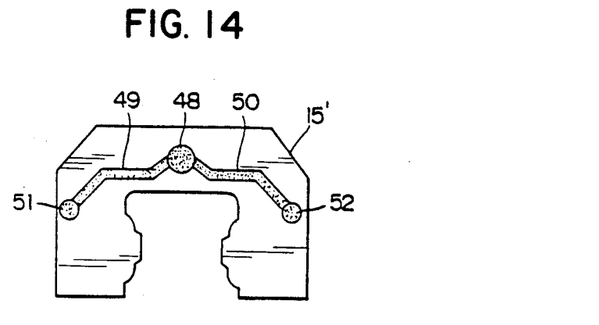
FIG. 14 is a sectional view taken along line XIV—XIV of FIG. 12.

A lubricating system of a linear motion ball bearing according to the invention will be described hereinafter in connection with the accompanying drawings. Generally, a linear ball bearing is provided at the opposite ends thereof with ball returning caps 15 and 15' and sealing plates 16 and 16' attached to the respective exteriors of the ball returning caps 15 and 15', as illustrated in FIG. 12. A reference numeral 44 indicates a lubricant supply hole formed in a bearing body 12 in a lateral direction thereof, while a reference numeral 45 indicates a lubricant supply hole formed along an axis extending perpendicularly to the lubricant supply hole 44. A lubricant is injected into the lubricant supply hole 44 through a lubricant supply port 46 provided on a lateral side of the bearing member 12. Generally, a grease is used as a lubricant, therefore, a grease nipple 47 is attached to the lubricant supply port 46 to inject a grease therethrough into the lubricant supply hole 44, however, any suitable lubricating agent may be employed. A through hole 48 is formed in the ball returning cap 15' in the central part thereof at a position corresponding to the lubricant supply hole 45. As shown in FIG. 14, a pair of grooves 49 and 50 are extended from the outer end of the through hole 48 in the exterior of the ball returning cap 15'. Through holes 51 and 52 are formed at the extremmities of the grooves 49 and 50 respectively. As shown in FIG. 13, Grooves 53 and 55 are formed from the inner ends of the through holes 51 and 52 to a pair of upper ball returning grooves 57 and 59 respectively, while grooves 53 and 55 are formed from the inner ends of the through holes 51 and 52 to a pair of lower ball returning grooves 58 and 60 respectively. Accordingly, the lubricant injected into the lubricant supply hole 44 through the lubricant supply port 46 flows through the lubricant supply holes 44 and 45 formed mutually perpendicularly in the bearing member and through the through hole 48 formed in the ball returning cap 15', and then the flow of the lubricant is deflected laterally by the sealing plate 16'. Then, the lubricant flows through the grooves 49 and 50 and through the through holes 51 and 52, and finally through the grooves 53 and 55 into the upper ball returning grooves 57 and 59 and through the grooves 54 and 56 into the lower ball returning grooves 58 and 60. Thus the four bearing races are lubricated by the lubricant as the balls circulate therethrough.

Figure 15:
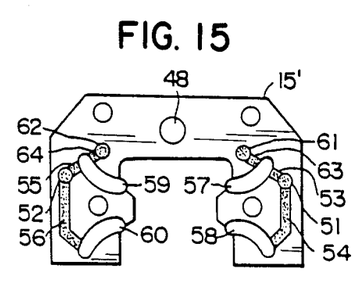
FIGS. 15 and 16 are views corresponding to FIGS. 13 and 14 respectively, showing another embodiment.
Figure 16:
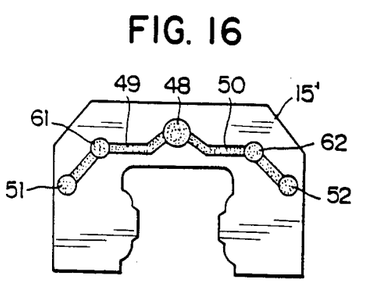

In the embodiment described hereinbefore, since the lubricant needs to flow upward when the lubricant is supplied to the upper ball returning grooves 57 and 59 through the through holes 51 and 52 and the grooves 53 and 55, the insufficient lubrication of the upper bearing races is liable to occur. The supply of the lubricant to the upper ball returning grooves will be ensured further by forming through holes 61 and 62 in the grooves 49 and 50 at positions above the upper ball returning grooves 57 and 59 and grooves 63 and 64 from the inner ends of the through holes 61 and 62 to the upper ball returning grooves 57 and 59 respectively as shown in FIGS. 15 and 16 to supply the lubricant into the upper ball returning grooves. The present invention is not limited to those embodiments which have been described hereinbefore and, naturally, various other modifications are possible. Furthermore, the additional provision of an axial lubricant supply hole similar to the axial lubricant supply hole 45 opposite the axial lubricant supply hole 45 in the arrangement of FIG. 12 and provision of the same through holes and the grooves in the ball returning cap 15 as those in the ball returning cap 15' will further improve the effect of supplying the lubricant.

Finally, a sealing device embodying the present invention will be described hereunder.

Figure 17:
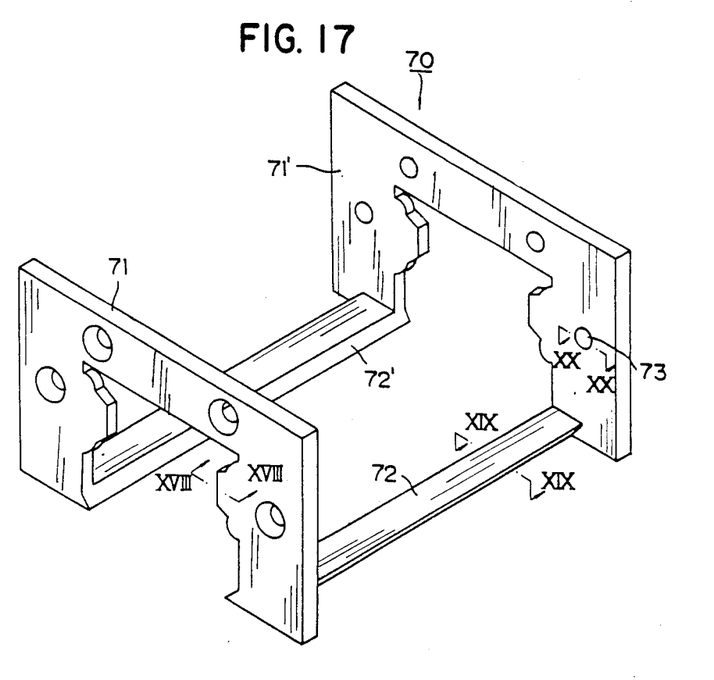
FIG. 17 is a perspective view showing a sealing device.
Figure 18:
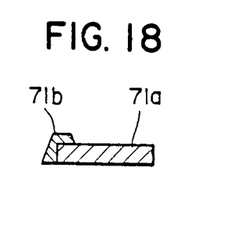
FIG. 18 is a sectional view taken along line XVIII—XVIII of FIG. 17.
Figure 19:
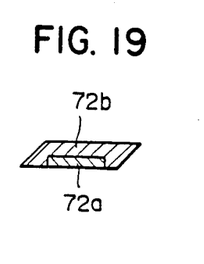
FIG. 19 is a sectional view taken along line XIV—XIV of FIG. 17.
Figure 20:
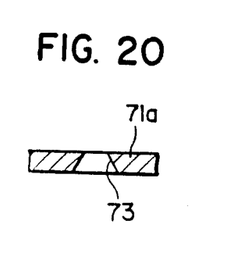
FIG. 20 is a sectional view taken along line XX—XX of FIG. 17.

FIG. 17 is a perspective view showing the construction of a sealing device 70 in detail. A sealing member 71b of a shape complementary to the configuration of the bearing rail 13 of FIG. 5 is fixed to a metal plate 71a as shown in FIG. 18 at a generally U-shaped opening formed in each of a pair of side plates 71 and 71' (which correspond to the sealing plates 16 and 16' shown in FIGS. 6 and 12). A sealing member 72b of a rhombic cross section is fixed similarly to the upper surface of a metal plate 72a as shown in FIG. 19 in each of a pair of bottom plate 72 and 72'. Indicated by a reference numeral 73 are holes for attaching the side plates 71 and 71' to the ball returning caps 15 and 15' respectively. FIG. 20 shows the cross section of the hole 73.

Figure 21:
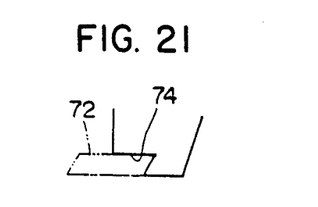
FIG. 21 is a sectional view showing the interconnection of a bottom plate, a bearing body and a return cap.

The distance between the side plates 71 and 71' is equal to the axial length of the bearing member 12 with the ball returning caps 15 and 15' attached thereto. Therefore, in attaching the sealing device of the present invention to the bearing member 12, first the ball returning caps 15 and 15' are secured to the bearing member 12, and then the sealing device 70 of the present invention is fitted on the assembly of the bearing member 12 and the ball returning caps 15 and 15' from below the assembly and is screwed to the ball returning caps 15 and 15'. The sealing device 70 can advantageously be incorporated into the assembly of the bearing member 12 and the ball returning caps 15 and 15', without using any particular fixing means, by forming grooves 74 of a cross section complementary to the rhombic cross section of the bottom plates 72 and 72' in the inner sides of the bottom surfaces of the bearing member 12 and the ball returning caps 15 and 15', as shown in FIG. 21. That is, since a lateral force is applied continuously by the rail base 13 to the bottom plates 72 and 72', the bottom plates 72 and 72' are urged continuously upward owing to the engagement of the bottom plates 72 and 72' with the inclined side walls of the grooves 74 so that the sealing device 70 is pressed against the assembly of the bearing member 12 and the ball returning caps 15 and 15'.

Figure 22:
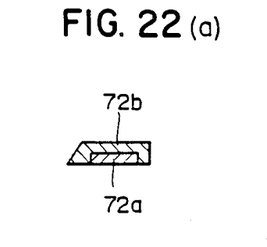
FIGS. 22(a) and 22(b) are sectional views showing the forms of other embodiments of the bottom plate, bearing body and the return cap.

Naturally, ordinary square grooves 75 may be formed in the bearing member 12 and the ball returning caps 15 and 15' to receive the bottom plats 72 and 72' therein, as shown in FIGS. 22(a) and 22(b). In such a case, usually, some fixing means, such as rivet means, is necessary.

Figure 23:
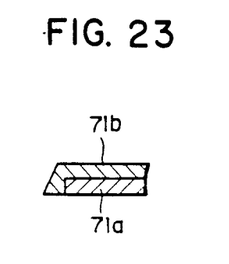
FIGS. 23 and 24 are sectional views corresponding to FIGS. 18 and 20, showing an embodiment of the ball bearing provided with a sealing member over the entire inner surface of the side plate.
Figure 24:
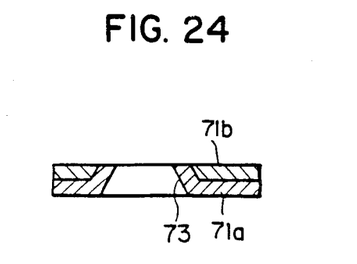

In case the entire inner surfaces of the side plates 71 and 71' are required to be covered with sealing members, the constitutions as shown in FIGS. 23 and 24 are employed, in which a particular configuration is required so that only part of the sealing members around will not be compressed.

Rubber, felt or a resin may be used as a material of the sealing members, however, the material is not limited thereto.

In most practical applications, the cross section of a linear ball bearing according to the present invention is symmetrical with respect to the center axis thereof as illustrated in FIG. 5. However, the cross section of a linear ball bearing according to the present invention is not necessarily be symmetrical and the present invention may be embodied in various modified forms, in which either the right-hand or the left-hand bearing mechanism may be substituted by an ordinary guide mechanism employing rollers, etc., or the bearing member and the rail base may be arranged in a vertical relation to use only one side of the whole structure.

INDUSTRIAL APPLICABILITY

The linear ball bearings according to the present invention is widely applicable to guiding the reciprocating parts or units of machine tools, industrial robots and the like.

1. In a linear motion ball bearing comprising a rail base, a bearing member movable along said rail base, a plurality of balls arranged in recirculating ball paths, the balls in parts of each recirculating path supporting the bearing member on the rail base while allowing linear movement of the bearing member along the rail base, end caps secured to said opposite ends of the bearing member, the end caps forming parts of the boundaries of the ball recirculating paths, and retainer means for preventing balls in said recirculating paths from separating from the bearing member;
    in which the end caps have holes for receiving projections, and the retainer means comprise at least one ball retainer extending longitudinally along the bearing member and having projections extending from its ends and fitted into said holes in the end caps;
    in which said projections extending from the ends of the ball retainer are aligned along an axis extending in parallel to the direction of movement of the bearing member along the rail base;
    in which the ball retainer has two curved ball-engaging surfaces arranged symmetrically with respect to said axis, one of said curved surfaces engages the balls in one of the recirculating paths, and the other of said curved surfaces engages the balls in another of said recirculating paths;
    in which the ball retainer and the end caps have cooperating means for preventing rotation of the ball retainer about said axis; and
    in which said cooperating means comprises a flat projection extending laterally from one of said projections which extend from the ends of the ball retainer, and a slot in one of said end caps extending laterally from one of said holes therein, said slot conforming to said flat projection, whereby rotation of the ball retainer is prevented.

2. A linear motion ball bearing comprising a rail base, a bearing member movable along said rail base, a plurality of balls arranged in recirculating ball paths, the balls in parts of each recirculating path supporting the bearing member on the rail base while allowing linear movement of the bearing member along the rail base, end caps secured to said opposite, ends of the bearing member, the end caps forming parts of the boundaries of the ball recirculating paths, and retainer means for preventing balls in said recirculating paths from separating from the bearing member;
    in which the end caps have holes for receiving projections, and the retainer means comprise at least one ball retainer extending lontitudinally along the bearing member and having projections extending from its ends and fitted into said holes in the end caps;
    in which said projections extending from the ends of the ball retainer are aligned along an axis extending in parallel to the direction of movement of the bearing member along the rail base;
    in which the ball retainer has a projection adjacent one end thereof and extending laterally with respect to the center axis; and
    in which the bearing member has a slot receiving the laterally extending projection;
    whereby the ball retainer is enabled to be fixed securely to the bearing member at least at one end thereof even when there is no bearing cap attached to the bearing member at said one end, thereby facilitating assembly.

3. A linear motion ball bearing comprising a rail base, a bearing member movable along said rail base, a plurality of balls arranged in recirculating ball paths, the balls in parts of each recirculating path supporting the bearing member on the rail base while allowing linear movement of the bearing member along the rail base, end caps secured to said opposite ends of the bearing member, the end caps forming parts of the boundaries of the ball recirculating paths, and retainer means for preventing balls in said recirculating paths from separating from the bearing member;
    in which the end caps have holes for receiving projections, and the retainer means comprise at least one ball retainer extending lontitudinally along the bearing member and having projections extending from its ends and fitted into said holes in the end caps;
    in which said projections extending from the ends of the ball retainer are aligned along an axis extending in parallel to the direction of movement of the bearing member along the rail base;
    in which the ball retainer has a first projection adjacent one end thereof and extending laterally with respect to said axis and a second projection adjacent the opposite end thereof and extending laterally with respect to said axis; and
    in which the bearing member has a pair of slots receiving the respective first and second laterally extending projections;
    whereby the ball retainer is enabled to be fixed securely at the opposite ends thereof to the bearing member even when only one of the end caps is attached to the bearing member, thereby facilitating assembly.

4. In a linear motion ball bearing comprising a rail base and a bearing member having opposite ends, the bearing member being movable along said rail base, a plurality of balls arranged in at least four recirculating ball paths, the balls in parts of each recirculating path supporting the bearing members on the rail base while allowing linear movement of the bearing member along the rail base, end caps secured to said opposite ends of the bearing member, each end cap having an inner face and an outer face, and having at least four ball returning grooves formed in the inner face thereof and constituting parts of the recirculating ball paths, wherein the bearing member has a lubricant supply opening in at least one of its opposite ends and the end cap secured to said one of said opposite ends has a first through hole communicating with said lubricant supply opening, first and second grooves extending laterally from said through hole in the outer face of said end cap, second and third through holes extending from the said first and second grooves through the end cap to the inner face thereof, sealing means covering the outer face of the end cap while allowing flow of lubricant in the through holes and in said first and second grooves, and grooves on the inner face of the end caps extending from the end of each of the second and third through holes to a pair of ball return grooves in said inner face, whereby lubricant from said lubricant supply opening is delivered to all four of the ball return grooves in said end cap.

5. A linear motion ball bearing according to claim 4 in which each of the second and third through holes is located at a level higher than the level of the uppermost ball return groove with which it is connected.

* * * * *